(No Model.)
R. HEINLE.
METER.
No. 287,283. Patented Oct. 23, 1883.
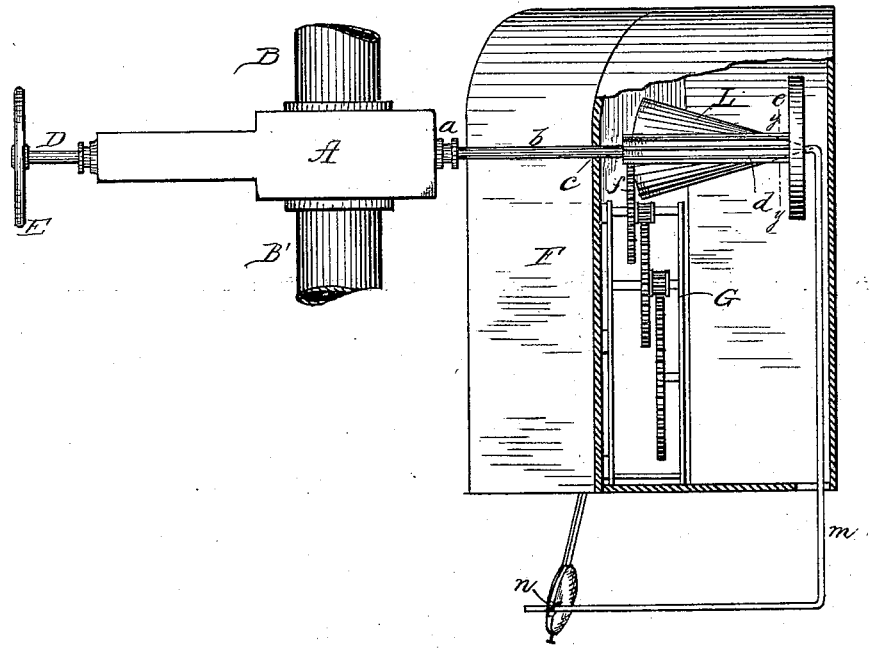
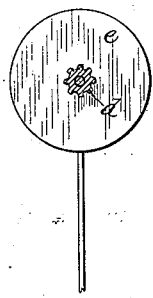
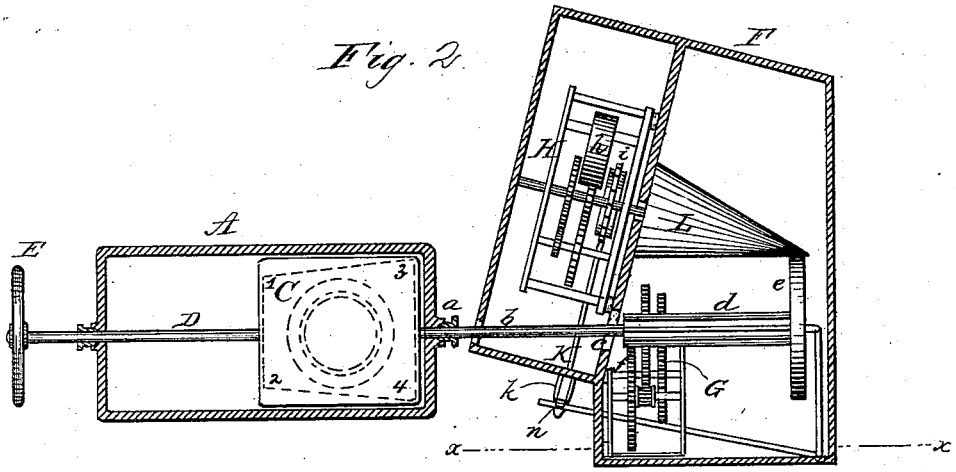

UNITED STATES PATENT OFFICE.

ROBERT HEINLE, OF ALLEGHENY, PENNSYLVANIA.

METER.

SPECIFICATION forming part of Letters Patent No. 287,283, dated October 23, 1883.

Application filed August 2, 1883. (No model.)

*To all whom it may concern:*

Be it known that I, ROBERT HEINLE, of Allegheny, in the county of Allegheny and State of Pennsylvania, have invented certain new and useful Improvements in Meters; and I do hereby declare that the following is a full, clear, and exact description of the invention, which will enable others skilled in the art to which it appertains to make and use the same, reference being had to the accompanying drawings, which form a part of this specification, in which—

Figure 1 is a plan view, partly in section, and Fig. 2 a vertical sectional view, of my invention. Fig. 3 is a detail section on line $y\,y$.

My invention has relation to meters for measuring and registering the quantity of fluid, steam, or gas which passes through a cock, gate, or valve during a given time.

My invention consists in the provision of means whereby the movement of a valve, gate, or other device for cutting off the flow of a gas, fluid, or steam will serve to release the pendulum of a clock-work movement, which in turn will actuate a train of gearing provided with indicating dials and hands.

It further consists in the provision of means whereby the amount of opening given to the valve will be compensated for by a more or less rapid movement of the registering devices, whereby an accurate record will be kept of the amount of fluid passing through the cock, gate, or valve in a given time, whether the said cock, gate, or valve be wholly or partially opened.

Referring to the accompanying drawings, A represents the body of the valve; B B', the inlet and outlet pipes; C, the gate on the interior of the valve closing said openings; D, the stem or screw by which said gate is moved, and E a hand-wheel on the outer end of said screw. From the end of the gate C, and through a stuffing-box, $a$, in the end of case A, projects a rod, $b$, which passes through an opening, $c$, in a box or case, F, within which are contained the registering mechanism and the clock-works. To the end of rod $b$ are attached an elongated pinion, $d$, and a disk, $e$. The rod $b$ moves longitudinally, and the pinion and disk are free to revolve upon said rod.

G represents a train of gearing operated by and in permanent connection with pinion $d$ through the cog-wheel $f$. To the shafts of certain of the wheels of G are attached suitable hands that pass over dials located on the outside of case F, and thereby indicate the number of revolutions of pinion $d$.

H is a clock-work, of any ordinary or desired form, situated within the case F, and provided with the spring $h$, the escapement $i$, and the pendulum K, having a bob, $k$, at its end. Upon the shaft of the escapement $i$, and projecting out over the disk $e$, is a cone, L, which comes in contact with and revolves said disk, and with it the pinion $d$, when the clock-work is in motion, causing the train of gearing G to revolve and the hands thereon to mark the revolutions on the respective dials.

Attached to the end of the rod $b$, outside of disk $e$, is a wire or slender rod, $m$, which projects out through an opening in the side of case F, and is bent around and upwardly until its end intercepts the path of motion of the pendulum-bob $k$. The wire $m$ is so arranged that the pendulum will strike it at or near the end of its stroke, and said pendulum has a nick or slot, $n$, which, when it comes in contact with wire $m$, will engage said wire, and thus hold the pendulum at the end of its stroke to one side. It will be observed that as the wire $m$ is bent up toward the pendulum-bob it will only engage with and hold said bob when it is at its extremest point—i. e., when the valve is entirely closed, and when, consequently, the registration should cease. The wire engages with the pendulum at the end of its stroke, in order that when the pendulum is released it will begin to swing and will start the clock-work, as, if the wire stopped the pendulum at the middle of its stroke, it would be necessary to start the pendulum by hand every time the valve was opened.

The operation of my invention is as follows: The clock-works having been wound, and the hands on the dials of the meter set at zero, the pendulum is hooked on or engaged with the wire $m$. Now, when the gate of the steam or fluid valve is opened, the rod $b$ is drawn out, causing the wire $m$ to slip out of the slot in the pendulum-bob, and the latter begins to swing and the clock-work to move, communicating motion through the cone L and disk $e$ to the gearing G, which in turn moves the hands upon the recording-dial. If the valve were on every occasion opened to its fullest extent, there would be no difficulty in recording the amount of fluid or steam passing through at a given pressure, as in this case the clock-work could be connected directly with the pinion operating the meter, it being only necessary that the latter should work at a certain determined speed during the time the valve was opened. It is, however, necessary to record a partial opening of the valve, in order to determine what has been the delivery through it for a certain number of hours or days, and this I accomplish by means of the arrangement of cone L and disk e, for as the valve is opened the disk, moving up toward the larger end of the cone, is moved, and causes the gearing G to move more rapidly than when the disk is nearer the smaller end. Thus, for instance, when the valve is opened one-half, the disk will be at the center of the cone, and the meter will work one-half as fast as when the valve is opened to its fullest extent and the disk is at the larger end of the cone. As the disk moves up to the larger end of the cone, it is harder to turn—that is, it obstructs to somewhat greater extent the movement of the clock and causes it to move slower. This I compensate for by gradually diminishing the valve-inlet, as shown in the dotted lines in Fig. 2 of the drawings, the said inlet being somewhat wedge-shaped—that is, being wider and of greater capacity at the side 3 4, from whence it gradually diminishes to the side 1 2; hence, as the clock moves more slowly as the valve is moved out, the opening of the latter increases only in such ratio as will cause the meter to record accurately the amount of fluid or gas passing through the valve.

Certain of the details herein described may be varied to a considerable extent without departing from the spirit of my invention. I do not therefore limit myself to the precise construction of the devices as I have described and shown them.

What I claim is—

1. In a registering device for attachment to a stop valve or throttle, and having a prime motor and registering-train, a friction-gear connecting the motor and recording-train, composed of a cone on the transmitting-shaft of the motor, and a friction-disk on the recording-train, adapted to axial adjustment along the cone, in combination with and connected to a valve-gate adapted to graduate its opening and compensate for the retarding effect of the cone-gear upon the clock-work, substantially as described.

2. The combination, with valve A, motor H, and registering-train G, of the interposed cone L, disk e, and elongated pinion d, sliding on rod b, attached to the valve-gate C, substantially as described.

3. The combination of valve A, gate C, rod b, and wire m, with clock-work H, pendulum K, and bob k, said wire being adapted to engage with the bob and stop the clock-work when the valve is closed, substantially as and for the purpose described.

In testimony that I claim the foregoing as my own I have hereto affixed my signature in presence of two witnesses.

ROBERT HEINLE.

Witnesses:
JOS. B. CONNOLLY,
D. E. DAVIS.